Figure 1:
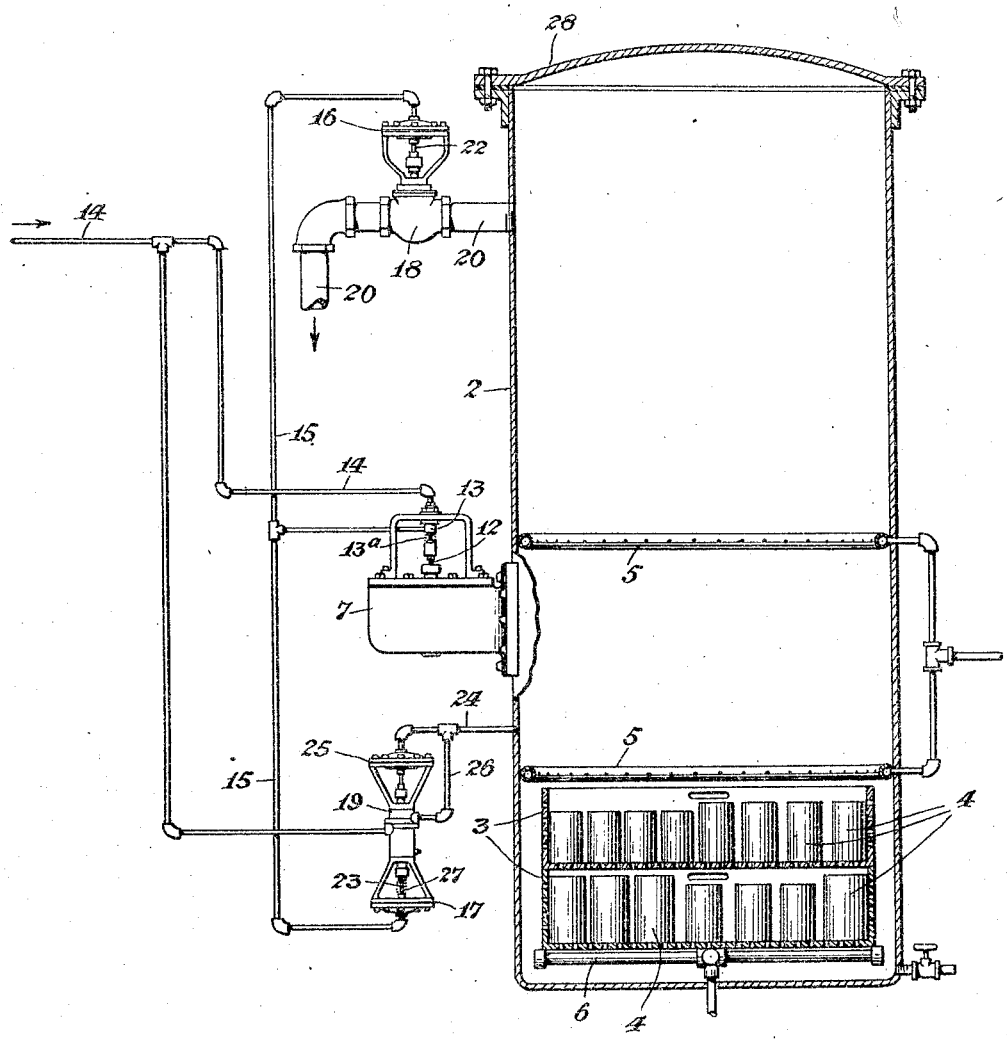

Aug. 25, 1925.

J. J. WILLIAMS 1,551,128

APPARATUS FOR CONTROLLING PRESSURE IN STERILIZING RETORTS AND OTHER CONTAINERS

Filed Feb. 27, 1924      4 Sheets-Sheet 1

INVENTOR
John J. Williams
BY
Clarence Kerr
ATTORNEY

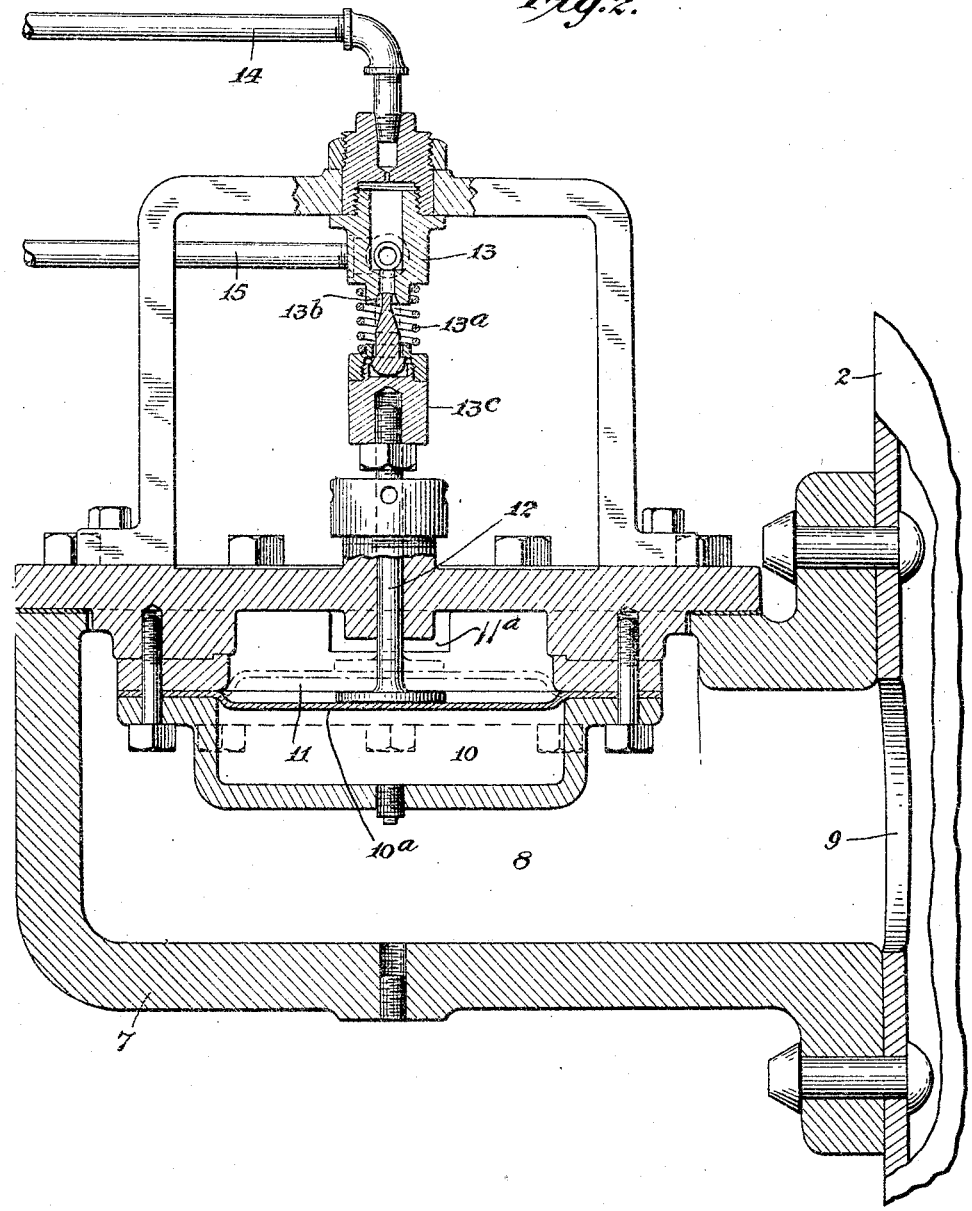

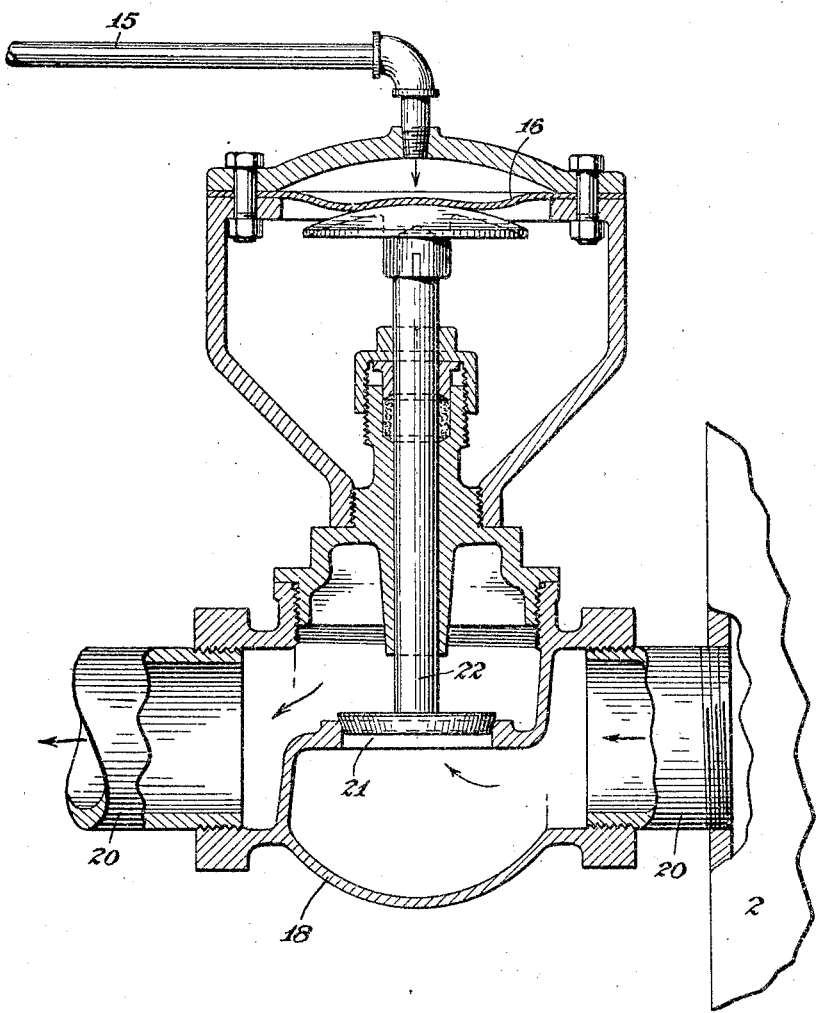

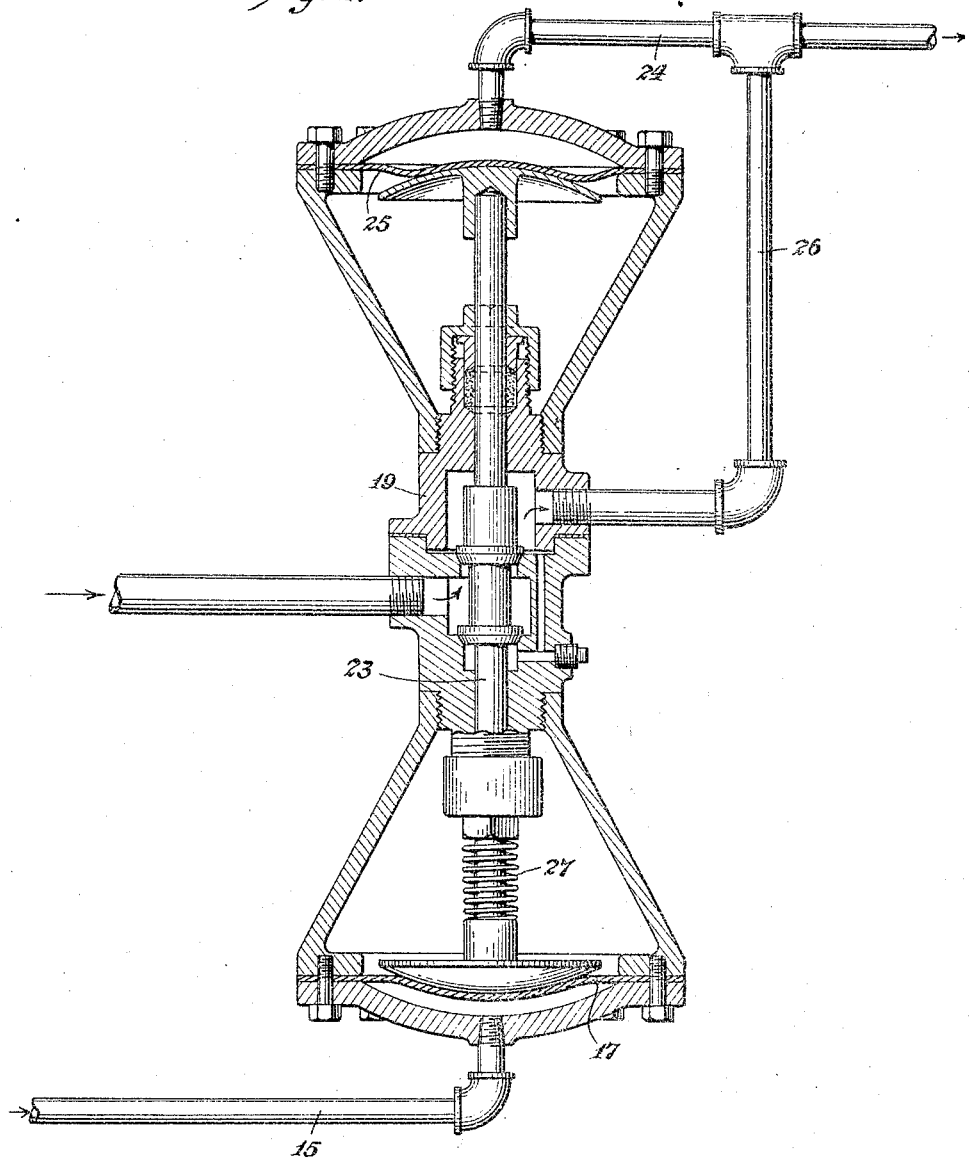

Patented Aug. 25, 1925.

1,551,128

UNITED STATES PATENT OFFICE.

JOHN J. WILLIAMS, OF WHEELING, WEST VIRGINIA, ASSIGNOR TO HAZEL-ATLAS GLASS COMPANY, OF WHEELING, WEST VIRGINIA, A CORPORATION OF WEST VIRGINIA.

APPARATUS FOR CONTROLLING PRESSURE IN STERILIZING RETORTS AND OTHER CONTAINERS.

Application filed February 27, 1924. Serial No. 695,446.

*To all whom it may concern:*

Be it known that JOHN J. WILLIAMS, citizen of the United States, and resident of Wheeling, Ohio County, West Virginia, has invented new and useful Improvements in Apparatus for Controlling Pressure in Sterilizing Retorts and Other Containers, of which the following is a specification, reference being had to the accompanying drawings, in which—

Fig. 1 is a vertical section of a sterilizing retort showing the application of my improvements thereto; Fig. 2 is a section of the regulating valve controlled by pressure within the retort; Fig. 3 is a section of the overflow valve; and Fig. 4 is a section of the air supply valve.

My invention relates to apparatus for controlling pressures in sterilizing retorts and comprises means for equalizing pressures in food containers during the processing of food products so that when the pressure in a food container due to the action of heat begins to rise, the pressure on the outside of the containers will be automatically increased to such an extent that it will prevent the internal pressure from blowing the covers off the containers. My invention may also be employed for equalizing or maintaining pressures in containers used for a variety of purposes in which the pressures must be maintained or equalized and comprises the various features which I shall hereinafter describe and claim.

Referring to the drawings, 2 indicates a processing retort of the usual character. Preferably arranged within the retort 2 are a series of metal baskets 3, of which I have shown one, intended to be stacked one on top of another, in which the food containers 4 are usually placed. Water pipes 5 are arranged around the sides of the retort for the admission of water thereinto, and in the bottom of the retort are arranged steam pipes 6 in the form of a four-arm spider.

Attached to the side of the retort 2 is a housing 7 containing a control compartment 8 in direct communication through the opening 9 with the interior of the retort 2. In the upper part of the compartment 8 is a diaphragm chamber 10, filled with water or other expansible fluid, the upper part of which is closed by the diaphragm $10^a$.

Above the diaphragm $10^a$ is a space 11 in communication through the opening $11^a$ with the interior of compartment 8, which is thereby subject to pressure conditions within the retort. The stem 12 of the regulating valve 13 at its lower end rests upon and is actuated by the diaphragm $10^a$. The valve 13 forms a regulating connection between the main air supply line 14 and the control air line 15. Normally the spring $13^a$ holds the valve 13 in open position, thus permitting air from the main line to waste to atmosphere through the opening $13^b$. Upon the stem 12 of the valve 13 is an adjusting nut $13^c$ by which the size of the valve opening $13^b$ may be regulated or adjusted. The control line 15 is connected with the actuating diaphragms 16 and 17 of the overflow water valve 18 and the air inlet valve 19, respectively.

The water valve 18 is arranged in the overflow pipe 20, which is tapped into the side of the retort 2 at a point preferably above the topmost container basket 3. The pressure below the seat 21 of the valve 18 tends to keep the valve 18 in raised or open position, while the pressure exerted on the upper end of the valve stem 22 by the diaphragm 16 tends to keep it closed. The valve 18 has a normal tendency to remain on the seat 21.

The air pressure valve 19 is operated by the pressure in the control line 15 against the diaphragm 17 at the lower end of the valve stem 23, and by the fluid pressure in the air inlet line 24 upon the diaphragm 25 at the upper end of the valve stem 23. When the pressure in the control line 15 against the diaphragm 17 is sufficient to lift the valve stem 23, air will then flow from the main air supply line 14 through the valve 19 out through by-pass 26 to the air inlet pipe 24, which leads into the retort 2. The valve 19 is normally kept in closed position by the spring 27.

In operating my improved device sealed food containers 4 are placed in the retort in baskets 3 and the lid 28 of the retort is clamped on. I then prefer to run cold water through the pipes 5 until the food containers 4 are covered. Next, live steam is preferably introduced into the retort through the spider 6 to effect heating, which with many food products is about 240° Fahrenheit. As the water in the retort becomes heated it causes the contents of the containers 4 to become heated and through expansion tends to cause the blowing off of the container covers, but this is prevented by a compensating increase in pressure in the retort, which is effected as follows: As the retort is heated the water in the compartment 8 and space 11 also becomes heated, thus heating the fluid in the chamber 10. As the chamber 10 is closed the heat generates pressure, and this causes the diaphragm $10^a$ to rise, carrying with it the valve stem 12, thus decreasing the size of the opening $13^b$ through which the air from the main supply pipe 14 wastes to atmosphere. As this opening $13^b$ is closed, the air from the supply pipe 14 will flow into control line 15 and build up a pressure therein. When the air flows into the control line 15, the pressure against the diaphragm 16 of the discharge valve 18 will cause it to bear firmly against its seat 21. As the pressure in the control line 15 builds up against the diaphragm 17, it will cause the valve stem 23 to lift the valve 19 from its seat $19^a$ and permit air to pass through the valve, the by-pass 26 and the inlet pipe 24, into the retort, thereby increasing the pressure therein, and offsetting the pressure which has been developed within the containers.

When the pressure in the inlet pipe 24 against the diaphragm 25, coupled with the pressure of the spring 27, exceeds the pressure of the air in the control line 15 against the diaphragm 17, the air valve 19 will close. It will therefore be seen that to open or keep open the air valve 19 it always takes an air pressure in the control line 15 greater than the pressure in the retort, and that when these pressures are at all equalized the strength of the spring 27 will close the air valve 19.

The exhaust valve 16 is always kept closed until the pressure on the retort side of the valve becomes greater than the pressure in the control line 15 against the diaphragm 16, when the pressure from the retort forces the valve 18 open, thus permitting the water to discharge through the pipe 20 and relieving the pressure in the retort.

As the pressure in the retort is increased so is the pressure in the space 11. And when this pressure plus the downward pressure of the spring 16 becomes greater than the pressure in the chamber 10, it will force the diaphragm $10^a$ downward, thus permitting the valve 13 to open, letting air escape through the opening $13^b$, diminishing the pressure in the air line 15, thus allowing the air valve 19 to close and the discharge valve 18 to open. This causes a diminution of the pressure in the retort and compartment 8 and space 11, and when this has become less than the pressure in the chamber 10 the diaphragm will tend to rise and close the valve 13.

In cooling, which is preferably effected by letting cold water into the retort through the nozzles 5, there is at first a reduction of pressure which causes the diaphragm $10^a$ to close the valve 13, thus causing the admission of air through the air valve 19. The admission of cooling water into the retort also causes the pressure therein to build up. Then when the pressure in the retort has again built up to such an extent that the pressure in the chamber 11, plus that of the spring $13^a$, causes the opening of the valve and line 15, the discharge valve also opens and relieves the pressure in the retort.

The operation of the valve 13 by the diaphragm $10^a$ is so regulated that the valve operates very quickly as the response of the diaphragm $10^a$ to changes in temperature and pressure is extremely rapid. While the temperature in the diaphragm chamber 10 corresponds substantially to the temperature of the containers and while the chamber is cooled at substantially the same rate as the retort, it will be seen that very little change is required in the pressure in the space 11 to force the diaphragm $10^a$ downward and thus open the valve 13, line 15, and thereafter the discharge valve 18, with the consequent raising of the diaphragm $10^a$ as the pressure in the retort becomes less. The diaphragm $10^a$ and valve 13 are always so adjusted that the pressure in the diaphragm chamber 10 is never greater than the pressure in the retort, and in consequence the pressure in the retort is always at least as great as the pressure in the containers.

I have found that my invention is extremely effective in preventing the spoiling of the contents of food and like containers during the processing operation, since by its use the pressures on the exterior of the container are maintained at least equal to the pressures within the container.

The simplicity of my control apparatus renders its use available at a low cost.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In apparatus for controlling pressure in sterilizing retorts, a retort, an air regulating valve, a discharge valve from the retort, an air inlet valve arranged to admit air into said retort, both said discharge valve and said inlet valve being exposed to the action of the pressure conditions in the retort, an air control line connecting the regulating valve and both the discharge and inlet valves, and an air supply line communicating with said control line through said regulating valve and with said retort through said inlet valve, the said regulating valve being responsive to pressure conditions in the interior of the retort for controlling the operation of discharge and inlet valves and thereby controlling pressure conditions in the retort.

2. In apparatus for controlling pressure in sterilizing retorts, a retort, inlet and discharge valves responsive to pressure conditions within the retort, a common air control line connected with and controlling the operation of each of said valves, a regulating valve controlling the admission of air into the control line responsive to pressure conditions within the retort, whereby the pressure in the retort is maintained and controlled.

3. In apparatus for controlling pressure in sterilizing retorts, a retort, inlet and discharge valves responsive to pressure conditions within the retort, a common air control line connected with and controlling the operation of each of said valves, a regulating valve controlling the admission of air into the control line, and means for opening and closing the regulating valve, said means being exposed to pressure conditions within the retort, whereby the pressure in the retort is maintained and controlled.

4. In apparatus for controlling pressure in sterilizing retorts, a retort, inlet and discharge valves responsive to pressure conditions within the retort, a common air control line connected with and controlling the operation of each of said valves, a regulating valve controlling the admission of air into the control line, and means for opening and closing the regulating valve, said means comprising a diaphragm the opposite sides of which are exposed to differing pressure conditions, the said diaphragm being arranged to move in one direction to open the regulating valve and in another direction to close said valve, whereby the pressure in the retort is maintained and controlled.

5. In apparatus for controlling pressure in sterilizing retorts, a retort, inlet and discharge valves responsive to pressure conditions within the retort, a common air control line connected with and controlling the operation of each of said valves, a regulating valve controlling the admission of air into the control line, a supplementary compartment in communication with the interior of the retort, a diaphragm in said compartment exposed to pressure conditions therein, and a connection between the regulating valve and the diaphragm, whereby the regulating valve is operated by pressure conditions in the retort.

6. In apparatus for controlling pressure in sterilizing retorts, a retort, inlet and discharge valves responsive to pressure conditions within the retort, a common air control line connected with and controlling the operation of each of said valves, a regulating valve controlling the admission of air into the control line, a supplementary compartment in communication with the interior of the retort, a diaphragm in said compartment exposed to pressure conditions therein, and a connection between the regulating valve and the diaphragm, said diaphragm also being exposed to the action of a body of fluid out of communication with the main body of fluid in the compartment, whereby the said diaphragm is actuated to open and close said regulating valve by the varying pressure conditions of the said bodies of fluid.

7. In apparatus for controlling pressure in sterilizing retorts, a retort, a discharge valve, an air line, an air admission valve arranged in said air line to admit air into the retort, a regulating valve controlling the admission of air into said air line, and means for operating the regulating valve, said means being exposed to pressure and temperature conditions within the retort whereby the pressure within the retort is controlled.

JOHN J. WILLIAMS.